(12) United States Patent
Cao

(10) Patent No.: US 9,800,680 B2
(45) Date of Patent: Oct. 24, 2017

(54) FILE TRANSFER SYSTEM, DEVICE AND METHOD

(75) Inventor: Fei Cao, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 881 days.

(21) Appl. No.: 12/772,581

(22) Filed: May 3, 2010

(65) Prior Publication Data

US 2010/0211599 A1    Aug. 19, 2010

Related U.S. Application Data

(63) Continuation of application No. PCT/CN2008/073027, filed on Nov. 12, 2008.

(30) Foreign Application Priority Data

Dec. 5, 2007    (CN) .......................... 2007 1 0199007

(51) Int. Cl.
*G06F 15/16* (2006.01)
*G06F 17/30* (2006.01)
(Continued)

(52) U.S. Cl.
CPC .............. *H04L 67/28* (2013.01); *H04L 51/04* (2013.01); *H04L 67/06* (2013.01);
(Continued)

(58) Field of Classification Search
CPC ....... H04L 12/581; H04L 67/28; H04L 67/06; H04L 67/2861; H04L 51/04; H04L 12/589; H04L 12/5895
(Continued)

(56) References Cited

U.S. PATENT DOCUMENTS 7,593,686 B1 *  9/2009  Knoop .............. H04N 7/17318
                                                          455/3.01
7,636,888 B2 * 12/2009  Campbell et al. ............ 715/708
(Continued)

FOREIGN PATENT DOCUMENTS

CN          1540945 A       10/2004
CN        101047511 A       10/2007
(Continued)

OTHER PUBLICATIONS

International Search Report for International Application No. PCT/CN2008/073027, dated Feb. 26, 2009, and English translation thereof.

(Continued)

*Primary Examiner* — Philip Chea
*Assistant Examiner* — Robert B McAdams
(74) *Attorney, Agent, or Firm* — Brinks Gilson & Lione

(57) ABSTRACT

A file transfer system including: a file sender, a file receiver, an Instant Messaging (IM) server, a file relay policy server and a file relay server. Also disclosed are the internal structures of the above file relay policy server and IM server and a file transfer method. If the file receiver has not logged in the IM system, it is possible that the file sender sends a file to the file relay policy server, the file relay policy server forwards the file to an appropriate file relay server, and the file relay server transfers the file to a mobile terminal as the file receiver according to a file transfer protocol of the file relay server itself, thereby facilitating the file transfer for the mobile subscriber and enhancing the mobile subscriber's experience in using the mobile IM service.

10 Claims, 2 Drawing Sheets

(51) Int. Cl.
*H04L 29/08* (2006.01)
*H04L 12/58* (2006.01)

(52) U.S. Cl.
CPC .......... *H04L 67/2861* (2013.01); *H04L 51/36* (2013.01); *H04L 51/38* (2013.01)

(58) Field of Classification Search
USPC ........................................ 709/206, 207, 230
See application file for complete search history.

(56) References Cited

U.S. PATENT DOCUMENTS

| | | | | |
|---|---|---|---|---|
| 7,831,673 | B1* | 11/2010 | Cohen et al. | 709/206 |
| 9,300,721 | B2* | 3/2016 | Liu | H04L 67/104 |
| 2004/0214588 | A1 | 10/2004 | Tanimoto | |
| 2005/0259656 | A1* | 11/2005 | Dollar et al. | 370/392 |
| 2006/0190546 | A1* | 8/2006 | Daniell | 709/206 |
| 2006/0224687 | A1* | 10/2006 | Popkin | G06F 17/30132 709/217 |
| 2006/0248157 | A1* | 11/2006 | Daniell et al. | 709/207 |
| 2007/0022213 | A1* | 1/2007 | Fahmy | H04L 51/04 709/246 |
| 2007/0174399 | A1* | 7/2007 | Ogle et al. | 709/206 |
| 2008/0071821 | A1* | 3/2008 | Zondervan et al. | 707/102 |
| 2008/0178253 | A1* | 7/2008 | Laurila | 726/1 |
| 2009/0144634 | A1* | 6/2009 | Berger | G06F 1/1622 715/747 |

FOREIGN PATENT DOCUMENTS

| | | |
|---|---|---|
| CN | 101075986 A | 11/2007 |
| CN | 101170523 A | 4/2008 |
| JP | 2005182169 A | 7/2005 |

OTHER PUBLICATIONS

Chinese Office Action for Chinese Patent Application No. 200710199007.0, dated Aug. 14, 2009, and English translation thereof.

Chinese Office Action for Chinese Patent Application No. 200710199007.0, dated May 12, 2010, and English translation thereof.

* cited by examiner

FILE TRANSFER SYSTEM, DEVICE AND METHOD

CROSS-REFERENCE TO RELATED APPLICATIONS

This application is a continuation of International Patent Application No. PCT/CN2008/073027, filed on Nov. 12, 2008. This application claims the benefit and priority of Chinese Patent Application No. 200710199007.0, filed Dec. 5, 2007. The entire disclosure of each of the above applications is incorporated herein by reference.

FIELD

The present disclosure relates to the mobile Instant Messaging (IM) technology and particularly to a file transfer system and method, and a file relay policy server and an IM server of the file transfer system.

BACKGROUND

This section provides background information related to the present disclosure which is not necessarily prior art.

The current mobile IM technology has been developed by combining the mobile communication technology and the IM technology. With the mobile IM technology, a mobile subscriber can log in an IM system through a mobile communication system and deliver an instant message or a file such as a picture, a voice file, a video file and a text with another mobile subscriber having logged in the IM system, thereby implementing various instant messaging services between mobile subscribers. At present, however, the delivery of an instant message or a file such as a picture, a voice file, a video file and a text between mobile subscribers has to be implemented on the premise that both of the mobile subscriber as a sender and the mobile subscriber as a receiver, respectively have logged in the IM system, i.e. they are in an on line state with respect to the IM system at the same time, which greatly limits the application of the mobile IM technology to the mobile communication system.

SUMMARY

This section provides a general summary of the disclosure, and is not a comprehensive disclosure of its full scope or all of its features.

To solve the above technical problem, the present invention provides a file transfer system and method, and a file relay policy server and an IM server of the file transfer system. With the file transfer system and method according to the present invention, even in the case that a mobile subscriber as a file receiver has not logged in the IM system, a file can be transferred to the mobile subscriber as the file receiver from a mobile terminal having logged in the IM system.

An embodiment of the present invention provides a file transfer system, including: a file sender, a file receiver, an Instant Messaging IM server, a file relay policy server and at least one file relay server, wherein
  the IM server is adapted to search for a service subscribed to by the file receiver in an IM system upon receiving an inquiry request from the file relay policy server and return an inquiry result to the file relay policy server;
  the file relay policy server is adapted to inquire the IM server for the service subscribed to by the file receiver in the IM system, determine a file transfer mode and forward a to-be-transferred file uploaded from the file sender to a file relay server corresponding to the determined file transfer mode; and
  the file relay server is adapted to send the to-be-transferred file received from the file relay policy server to the file receiver according to a file transfer protocol of the file relay server itself.

An embodiment of the present invention provides a file transfer method, including:
  receiving identification information of a file receiver and attribute information of a to-be-transferred file;
  sending an inquiry request carrying the identification information of the file receiver to an Instant Messaging IM server to inquire for a service subscribed to by the file receiver in an IM system;
  determining a file transfer mode according to the attribute information of the to-be-transferred file and the service subscribed to by the file receiver in the IM system and returned from the IM server;
  receiving the to-be-transferred file; and
  forwarding the to-be-transferred file and identification information of the file receiver to a file relay server corresponding to the determined file transfer mode.

An embodiment of the present invention provides a file relay policy server, including:
  a user interface module, adapted to receive identification information of a file receiver and attribute information of a to-be-transferred file, and receive the to-be-transferred file uploaded from a file sender;
  a service inquiring module, adapted to send an inquiry request carrying the identification information of the file receiver to an Instant Messaging IM server to inquire for a service subscribed to by the file receiver in an IM system;
  a file transfer mode determining module, adapted to determine a file transfer mode according to the attribute information of the to-be-transferred file and the service subscribed to by the file receiver in the IM system, returned from the IM server and received by the service inquiring module; and
  a file forwarding module, adapted to forward the to-be-transferred file and identification information of the file receiver received by the user interface module to a file relay server corresponding to the file transfer mode determined by the file transfer mode determining module.

An embodiment of the present invention provides an IM server, including: a service searching module, adapted to search for a service subscribed to by a file receiver in an IM system upon receiving an inquiry request from a file relay policy server and return an inquiry result to the file relay policy server.

As can be seen from the above, the file transfer method according to the present invention does not have the limitation that the file receiver has to have logged in the IM system. In other words, in the case that the file receiver has not logged in the IM system, it is possible that the file sender sends a file to the file relay policy server, the file relay policy server forwards the file to an appropriate file relay server, and the file relay server transfers the file to a mobile subscriber as the file receiver through a file transfer mode configured for the file relay server itself, thereby facilitating the file transfer for the mobile subscriber and enhancing the mobile subscriber's experience in using the mobile IM service.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

To enable those skilled in the art to better understand the above and other features and advantages of the present invention, exemplary embodiments of the present invention are described in detail below with reference to the accompanying drawings, in which.

Figure 3:
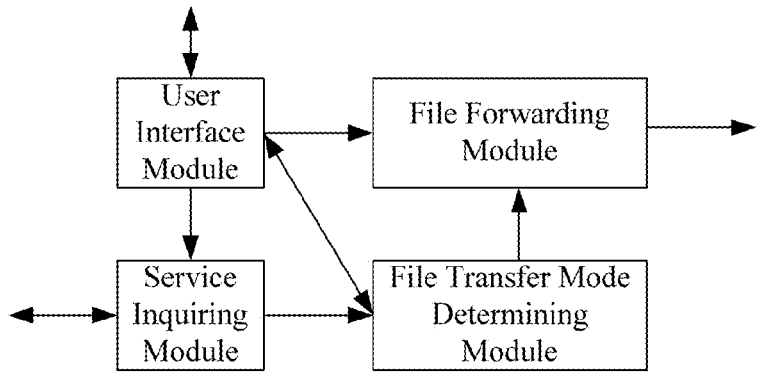
Figure 4:
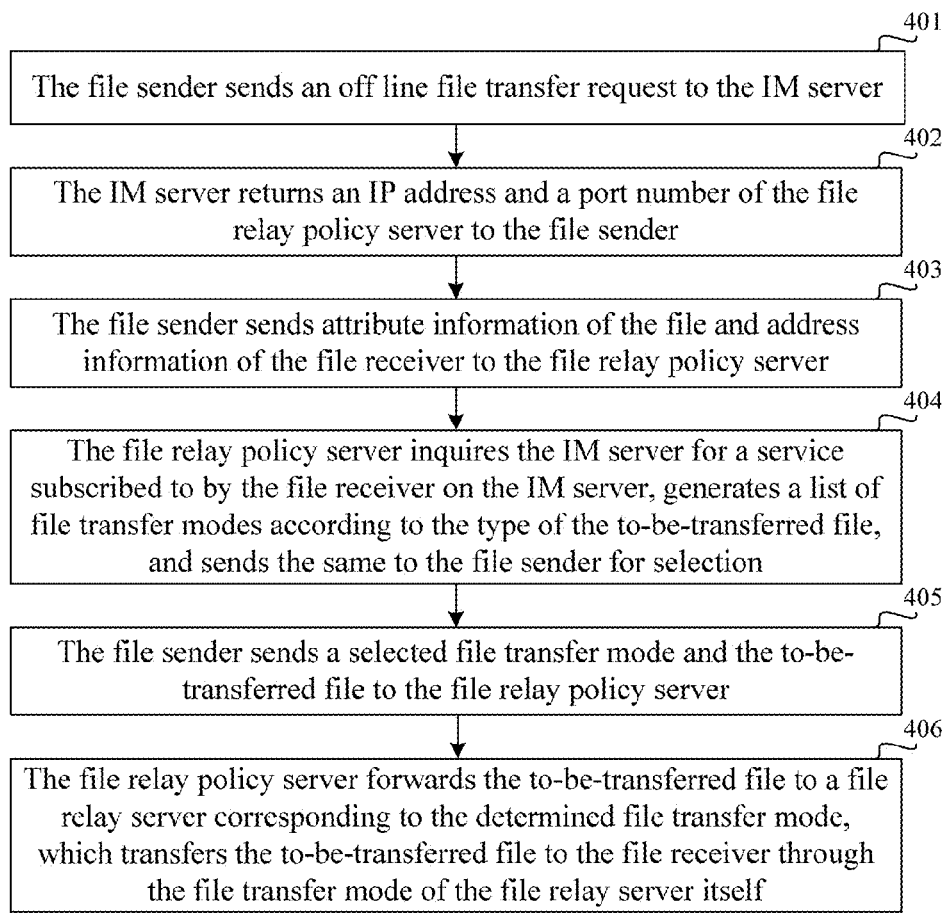

FIG. 3 a schematic diagram illustrating the internal structure of a file relay policy server according to an embodiment of the present invention; and FIG. 4 is a flow chart illustrating a file transfer method according to an embodiment of the present invention.

Corresponding reference numerals indicate corresponding parts throughout the several views of the drawings.

DETAILED DESCRIPTION

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

To make the objects and technical solutions of the present invention more apparent, the present invention is further described in detail below with reference to the accompanying drawings and the specific embodiments.

Figure 1:
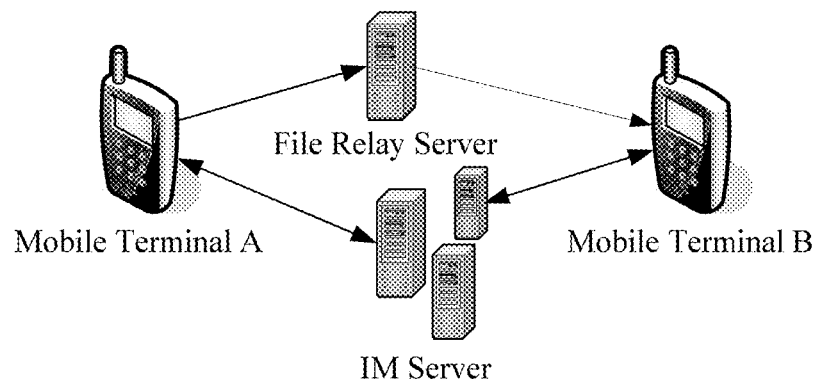
FIG. 1 is a schematic diagram illustrating a simplified structure of a mobile communication system to which the mobile IM technology is applied.

FIG. 1 is a schematic diagram illustrating a simplified structure of a mobile communication system to which the mobile IM technology is applied. As shown in FIG. 1, the mobile communication system includes at least two mobile terminals performing the instant messaging through the mobile IM technology, for example a mobile terminal A and a mobile terminal B, and an IM server located within a fixed network. Each of the mobile terminal A and the mobile terminal B is connected to the IM server located within the fixed network through a mobile communication system of itself and delivers an instant message through the IM server. In addition, for the transferring of a file, such as a picture file, an audio file, a video file and a text file between mobile subscribers, in addition to the IM server, the mobile communication system to which the mobile IM technology is applied should further include a file relay server, adapted to transfer various types of files mentioned above between mobile terminals performing the instant messaging, for example, the mobile terminal A and the mobile terminal B as shown in FIG. 1.

The process that the mobile terminals in the mobile communication system as shown in FIG. 1 transfer a file therebetween through the IM system mainly includes the following steps. A mobile terminal as a file sender exchanges with a mobile terminal as a file receiver through the IM server, various information for establishing a connection, for example, address information of the file relay server, including an Internet (IP) address and a port number, and room information recorded on the file relay server, such as a room number and a room key; and then transfers a file through the file relay server.

The process that the mobile terminal A transfers a file to the mobile terminal B through the mobile communication system shown in FIG. 1 is described in brief below. The process mainly includes the following steps.

1) The mobile terminal A sends a file transfer request to the mobile terminal B through the IM server.

2) Upon receiving the file transfer request, the mobile terminal B returns an acknowledgement, indicating that the mobile terminal B has received the file transfer request sent from the mobile terminal A, to the mobile terminal A through the IM system.

3) The mobile terminal B applies to the file relay server for a room, i.e. requests for adding a room record in a database of the file relay server. The room record contains room information (including a room number and a room key) assigned to the room record and identification information of the file sender, i.e. the mobile terminal A. Then the mobile terminal B sends the address information of the file relay server and the assigned room information to the mobile terminal A through the IM server.

4) The mobile terminal A access the file relay server according to the received address information of the file relay server, and establishes a connection with the corresponding room record on the file relay server according to the received room information.

5) The file relay server requests the mobile terminal A and the mobile terminal B to transfer a file therebetween.

6) The mobile terminal A sends a file to the file relay server.

7) The file relay server receives the file and forwards the received file to the mobile terminal B.

As can be seen from the above file transferring process, at present, only after both of the two mobile subscribers to transfer a file therebetween have logged in the IM system through the mobile terminals, the file can be transferred between the two mobile terminals. That is to say, the file transfer through the mobile IM technology has to be implemented on the premise that both of the mobile terminals to transfer a file therebetween have logged in the IM system, i.e. are in an on line state with respect to the IM system. In many cases in practical applications, however, the mobile terminals to transfer a file therebetween are not always in an on line state at the same time. For example, when a file sender is to transfer a file to a file receiver, it is possible that the file receiver has not logged in the IM system, i.e. is in an off line state with respect to the IM system, so that the IM system can not transfer the file to the file receiver successfully, thereby impairing the subscriber's experience in transferring a file using the mobile IM service to a great extent and greatly limiting the application of the mobile IM service to the mobile communication system.

To solve the problem occurring in the file transfer process in the prior art, the embodiments of the present invention provide a file transfer system, with which a mobile terminal having logged in the IM system can transfer a file to a mobile terminal as a file receiver, even in the case that the mobile terminal as the file receiver has not logged in the IM system.

Figure 2:
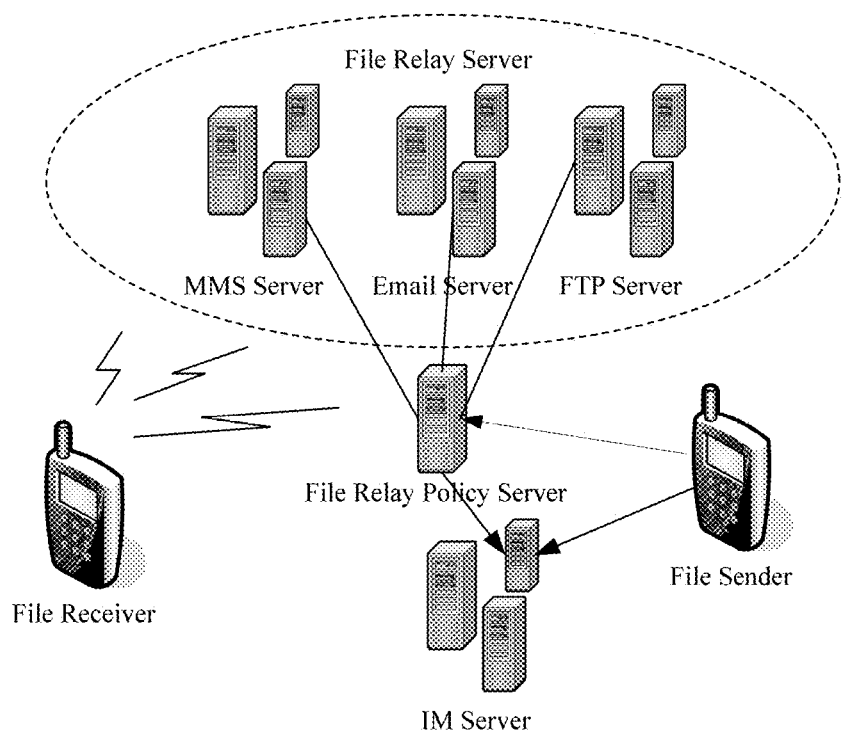
FIG. 2 is a schematic diagram illustrating a simplified structure of a file transfer system according to an embodiment of the present invention.

FIG. 2 is a schematic diagram illustrating the internal structure of a file transfer system according to an embodiment of the present invention. As can be seen in FIG. 2, the file transfer system according to the embodiment mainly includes mobile terminals to transfer a file therebetween, an IM server, a file relay policy server and at least one file relay server.

The mobile terminals to transfer a file therebetween include a mobile terminal having logged in the IM system and acting as a file sender and a mobile terminal having not logged in the IM system and acting as a file receiver. For the convenience of description, hereinafter the expressions "file sender" and "file receiver" are used to represent the mobile terminal acting as a file sender and the mobile terminal acting as a file receiver, respectively.

According to the embodiment, when the file sender is to transfer a file to the file receiver, the file sender first inquires for the state of the file receiver, i.e. whether the file receiver has logged in the IM system. If yes, the file sender transfers the file to the file receiver through a conventional file transfer method. Otherwise, the file sender first sends an off line file transfer request to the IM server to obtain address information of the file relay policy server, at least including its IP address and port number. Then, the file sender establishes a connection with the file relay policy server according to the received address information of the file relay policy server, and sends identification information of the file receiver and attribute information of the to-be-transferred file to the file relay policy server. The identification information of the file receiver includes an IM number UIN of the file receiver or a mobile phone number of the file receiver. The attribute information of the to-be-transferred file includes the type, size, name of the file and so on. Afterwards, the file receiver selects an appropriate file transfer mode according to a prompt from the file relay policy server, and sends the selected file transfer mode and the to-be-transferred file to the file relay policy server. The file transfer mode may includes various modes for implementing the file transfer, such as a Multimedia Messaging Service (MMS) mode, an electronic mail (email) service mode and a file transfer protocol (FTP) mode. Finally, the file relay policy server forwards the received to-be-transferred file and the identification information of the file receiver to a file relay server corresponding to the file transfer mode fed back by the file sender, and the file relay server sends the to-be-transferred file to the file receiver through the file transfer mode of the file relay server itself. It should be noted that if having known the address information of the file relay policy server, the file sender does not need to request the address information of the file relay policy server from the IM server, and instead, may directly establishes a connection with the file relay policy server and sends the identification information of the file receiver and the attribute information of the to-be-transferred file to the file relay policy server.

Specifically, in addition to all the IM functions, the IM server according to the embodiment is further used to implements the following functions.

First, the IM server receives the off line file transfer request from the file sender and returns the address information of the file relay policy server, including an IP address and a port number, to the file sender.

Second, the IM server receives an inquiry request from the file relay policy server, searches for a service subscribed to by the file receiver in the IM system, for example, an MMS service, an email service or an FTP service, according to the identification information of the file receiver carried in the inquiry request, and returns an inquiry result to the file relay policy server. It is to be noted that if the identification information of the file receiver carried in the inquiry request contains only a mobile phone number of the file receiver, the file receiver needs to subscribe to, in advance, a service binding its mobile phone number with an IM number of itself, so that upon receiving the mobile phone number of the file receiver, the IM server can obtain the IM number of the file receiver and further search for a service subscribed to by the instant messaging subscriber corresponding to the IM number in the IM system, according to the IM number of the file receiver.

The file relay policy server according to the embodiment is adapted to receive the identification information of the file receiver and the attribute information of the to-be-transferred file, and according to the received identification information of the file receiver, for example the IM number UIN or the mobile phone number of the file receiver, sends an inquiry request carrying the identification information of the file receiver to the IM server to inquire for the service subscribed to by the file receiver in the IM system; then, generates a list of file transfer modes according to the attribute information of the to-be-transferred file and the service subscribed to by the file receiver in the IM system returned from the IM server, and sends the same to the file sender for the sender side mobile subscriber to select a file transfer mode therefrom; and finally, forwards the to-be-transferred file and the identification information of the file receiver received from the file sender to the file relay server corresponding to the file transfer mode fed back by the file sender. In addition to the to-be-transferred file and the identification information of the file receiver, the file relay policy server may further sends identification information of the file sender to the file relay server corresponding to the determined file transfer mode to inform the information of the file sender to the file receiver.

In a practical application, for the simplification of the flow of the interactions between the file sender and the file relay policy server, the file relay policy server may select an appropriate file transfer mode according to the type of the file and the service subscribed to by the file receiver in the IM system upon obtaining the service subscribed to by the file receiver in the IM system, without the need of generating the list of file transfer modes, and without needing that the file sender selects a file transfer mode from the generated list. For example, if the file receiver supports the MMS mode, the email mode and the FTP mode, a picture file, a voice file and a video file may be determined to be transferred through the MMS mode, and other types of file may be determined to be transferred through the email mode or the FTP mode. In this case, upon determining the file transfer mode, the file relay policy server sends the file transfer request to the file sender, requesting, through a prompt, the file sender to upload the to-be-transferred file to the file relay policy server, and forwards the received to-be-transferred file, the identification information of the file sender and the identification information of the file receiver to the file relay server corresponding to the determined file transfer mode. Here, the file sender also does not need to select a file transfer mode, and instead, uploads the to-be-transferred file to the file relay policy server directly according to the prompt from the file relay policy server. Alternatively, the file sender may upload the to-be-transferred file to the file relay policy server while sending the attribute information of the to-be-transferred file. In this way, upon determining the file transfer mode, the file relay policy server may forward the to-be-transferred file directly to the file relay server corresponding to the determined file transfer mode, without the need of requesting the file sender to upload the to-be-transferred file.

In the above implementations, it is possible that the file relay policy server finds that no appropriate file transfer mode can be used to transfer the to-be-transferred file upon becoming aware of the service subscribed to by the file receiver in the IM system, for example, because the file receiver has not subscribed to any service that can be used to transfer a file in the IM system, or the file receiver has subscribed to only the MMS but the type of the to-be-transferred file is not suitable to be transferred through the MMS. In this case, the file relay policy server returns to the file sender a prompt indicative of a file transfer failure, which may further carry the reason for the file transfer failure.

The file relay policy server according to the embodiment may be any server that can be used to transfer a file in the existing mobile communication system, such as an MMS server, an email server and an FTP server. Upon determining the file transfer modem, the file relay policy server selects a file relay server corresponding to the determined file transfer mode to transfer the to-be-transferred file. For example, when determining that the MMS mode is used to transfer the to-be-transferred file, the file relay policy server forwards the to-be-transferred file, the identification information of the file sender and the identification information of the file receiver received from the file sender to the MMS server. When determining that the email mode is used to transfer the to-be-transferred file, the file relay policy server forwards the to-be-transferred file, the identification information of the file sender and the identification information of the file receiver received from the file sender to the email server. When determining that the FTP mode is used to transfer the to-be-transferred file, the file relay policy server forwards the to-be-transferred file, the identification information of the file sender and the identification information of the file receiver received from the file sender to the FTP server.

Upon receiving the to-be-transferred file and the identification information of the file receiver forwarded from the file relay policy server, a file relay server like the above sends the to-be-transferred file to the file receiver according to the file transfer protocol of the file relay server itself according to the identification information of the file receiver. When further receiving the identification information of the file sender forwarded from the file relay policy server, the file relay server may further send the received identification information of the file sender to the file receiver to inform the information of the file sender to the file receiver. Specifically, when the MMS mode is used to transfer the to-be-transferred file, the MMS server has a received file, such as a picture file, a voice file and a video file, carried in a multimedia short message and sends the message to the file receiver. When the email mode is used to transfer the to-be-transferred file, the email server sends the received to-be-transferred file as an attachment of an email to the file receiver. When the FTP mode is used to transfer the to-be-transferred file, the FTP server establishes a connection with the file receiver to send the received to-be-transferred file to the file receiver through the FTP mode.

Thereafter, the file receiver may receive the MMS, the email or an FTP connection request, and thus receives the file transferred from the file sender.

To implement the above technical solutions, an embodiment of the present invention provides a file relay policy server, the internal structure of which is shown in FIG. 3 and which mainly includes:

a user interface module, adapted to receive identification information of a file receiver and attribute information of a to-be-transferred file, output a list of file transfer modes to a file sender, and receive a file transfer mode and the to-be-transferred file returned from the file sender;

a service inquiring module, adapted to send an inquiry request carrying the identification information of the file receiver to an IM server to inquire for a service subscribed to by the file receiver in an IM system;

a file transfer mode determining module, adapted to generate a list of file transfer modes that are selectable by the file sender according to the attribute information of the to-be-transferred file and the service subscribed to by the file receiver in the IM system, returned from the IM server and received by the service inquiring module, send the list to the file sender through the user interface module, and receive a file transfer mode selected by a mobile subscriber through the user interface module, or prompt the file sender of a file transfer failure when detecting that there is no available file transfer mode, and may further prompt the reason for the file transfer failure; and a file forwarding module, adapted to forward the to-be-transferred file and identification information of the file receiver received by the user interface module to a file relay server corresponding to the file transfer mode determined by the file transfer mode determining module. The file forwarding module may further send identification information of the file sender to a corresponding relaying server to inform the information of the file sender.

Alternatively, the file transfer mode determining module may determine an appropriate file transfer mode directly according to the type of the to-be-transferred file and the service subscribed to by the file receiver in the IM system, returned from the IM server and received by the service inquiring module, and request, through a prompt via the user interface module, the subscriber to upload the to-be-transferred file, or prompt the file sender of a file transfer failure when detecting that there is no available file transfer mode, and may further prompt the reason for the file transfer failure. In this case, the user interface module does not output the list of file transfer modes to the file sender any more, and does not receive the file transfer mode returned from the file sender any more, but only requests, through a prompt, the file sender to upload the to-be-transferred file and receives the to-be-transferred file uploaded from the file sender; or alternatively, the user interface module does not need to request, through a prompt, the file sender to upload the to-be-transferred file, but directly receives the to-be-transferred file uploaded from the file sender.

An embodiment of the present invention also provides an internal structure of the IM server. In addition to the functional modules for the conventional functions of an IM server, the IM server according to the embodiment further includes: a service searching module, adapted to search for a service subscribed to by a file receiver in an IM system upon receiving an inquiry request from a file relay policy server and return an inquiry result to the file relay policy server. The IM server may further includes an address inquiring module, adapted to receive an off line file transfer request from a file sender and send address information of the file relay policy server to the file sender.

Another embodiment of the present invention provides a method for transferring a file in the above file transfer system, the main process of which is as shown in FIG. 4. The file transfer method according to the embodiment of the present invention is described in detail below with reference to FIGS. 2 and 4.

As shown in FIG. 4, the file transfer method mainly includes the following steps.

Step 401: When determining through an inquiry that the file receiver is in an off line state, the file sender sends an off line file transfer request to the IM server.

Step 402: Upon receiving the off line file transfer request, the IM server returns an IP address and a port number of the file relay policy server to the file sender.

As described above, if the file sender has known the address information of the file relay policy server, it does not need to perform the above steps 401 and 402, and the following step 403 may be performed directly.

Step 403: The file sender sends attribute information of the file and address information of the file receiver to the file relay policy server.

Step 404: Upon receiving the address information of the file receiver, the file relay policy server inquires the IM server for a service subscribed to by the file receiver on the IM server, for example, a service that can be user to transfer a file, such as an MMS service, an email service and FTP, then generates a list of file transfer modes usable by the file sender according to the attribute information of the to-be-transferred file, and sends the same to the file sender for selection.

Step 405: The file sender sends a selected file transfer mode and the to-be-transferred file to the file relay policy server.

In this step, the subscriber may select an MMS mode, an email mode and an FTP mode for transferring the to-be-transferred file.

As described above, as a first alternative, the following steps 4041 and 4051 may be adopted to take the place of the above steps 404 and 405.

Step 4041: Upon receiving the address information of the file receiver, the file relay policy server inquires the IM server for a service subscribed to by the file receiver on the IM server, for example, a service that can be user to transfer a file, such as an MMS service, an email service and FTP, then determines a file transfer mode according to the attribute information of the to-be-transferred file, and request, through a prompt, the file sender to upload the to-be-transferred file.

Step 4051: The file sender sends the to-be-transferred file to the file relay policy server.

As a second alternative, the following steps 4032, 4042 and 4052 may be adopted to take the place of the above steps 403, 404 and 405.

Step 4032: The file sender sends attribute information of the file, address information of the file receiver and the to-be-transferred file to the file relay policy server.

Step 4042: Upon receiving the address information of the file receiver, the file relay policy server inquires the IM server for a service subscribed to by the file receiver on the IM server, for example, a service that can be user to transfer a file, such as an MMS service, an email service and FTP, and then determines a file transfer mode according to the attribute information of the to-be-transferred file.

Step 4052: The file sender sends the selected file transfer mode and the to-be-transferred file to the file relay policy server.

Step 406: The file relay policy server forwards the to-be-transferred file to a file relay server corresponding to the determined file transfer mode, and the file relay server transfers the to-be-transferred file to the file receiver through the file transfer mode of the file relay server itself.

In this step, when determining that the MMS mode is used to transfer the file, the file relay policy server forwards the to-be-transferred file to an MMS server as a relaying server, and the MMS server has the received file, such as a picture file, a voice file and a video file, carried in a multimedia short message and sends the message to the file receiver. When determining that the email mode is used to transfer the file, the file relay policy server forwards the to-be-transferred file to an email server as a relaying server, and the email server sends the received to-be-transferred file to the file receiver as an attachment to an email. When determining that the FTP mode is used to transfer the file, the file relay policy server forwards the to-be-transferred file to an FTP server as a relaying server, and the FTP server establishes a connection with the file receiver and sends the received to-be-transferred file to the file receiver through the FTP mode. Furthermore, when determining that there is no appropriate file transfer mode for selection, the file relay policy server prompts the file sender of a file transfer failure, and may further prompt the file sender of the reason for the file transfer failure.

As can be seen from the above file transfer system and method according to the embodiments of the present invention, the file transfer system and method provided the embodiments of the present invention do not have the limitation that the file receiver has to have logged in the IM system. In other words, in the case that the file receiver has not logged in the IM system, it is possible that the file sender sends a file to the file receiver via the IM system through a mode that can be used to transfer a file, such as MMS, email and FTP, thereby facilitating the file transfer for the mobile subscriber and enhancing the experience in the mobile IM service.

The foregoing is merely preferred embodiments of the present invention, and is not intended to limit the present invention. Any modifications, equivalents, improvements and so on that are made without departing from the spirit and principle of the present invention are intended to fall into the scope of the present invention.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A file transfer system, comprising: a file sender device which includes a processor coupled to a memory storing instructions for execution by the processor and is in an online state, a file receiver device which includes a processor coupled to a memory storing instructions for execution by the processor and is in an offline state, an Instant Messaging (IM) server device, a file relay policy server device and at least one type of file relay server device, wherein the IM server device includes a processor coupled to a memory storing instructions for execution by the processor and comprises at least one module, and is adapted to:

receive from the file sender device an offline file transfer request for transferring a to-be-transferred file and after determining by the file sender device through the IM server that the file receiver device is currently offline;

send address information of the file relay policy server device upon receiving the offline file transfer request to the file sender device for communicating with the file relay policy server;

search for types of file transfer services corresponding to the at least one type of file relay server device and subscribed to by the file receiver device in an IM system upon receiving an inquiry request from the file relay policy server device; and return an inquiry result to the file relay policy server device; and the file relay policy server device includes a processor coupled to a memory storing instructions for execution by the processor and is adapted to:

receive attribute information of the to-be-transferred file and identification information of the file receiver device sent from the file sender device;

inquire the IM server device for the types of file transfer services subscribed to by the file receiver device in the IM system upon receiving the identification information of the file receiver device;

generate a list of file transfer modes representing file transfer services among the types of file transfer services subscribed by the file receiver device that are suitable for transferring files of the received attribute of the to-be-transferred file;

send the generated list of file transfer modes to the file sender device for selecting a file transfer mode therefrom;

determine a file transfer mode for transferring to-be-transferred file offline according to the selected file transfer mode by the sender device; and forward the to-be-transferred file uploaded from the file sender device to a file relay server device among the at least one type of file relay server device corresponding to the determined file transfer mode, wherein the file relay server device includes a processor coupled to a memory storing instructions for execution by the processor and is adapted to send the to-be-transferred file received from the file relay policy server device to the file receiver device being in the offline state according to a file transfer protocol of the type of file relay server device itself.

2. The system according to claim 1, wherein the file relay policy server device comprises at least one module, adapted to prompt the file sender device of a file transfer failure when determining that there is no available file transfer mode for selection, wherein the file transfer failure is displayed at the file sender device.

3. The system according to claim 1, wherein the at least one type of file relay server device comprises:

a Multimedia Messaging Service (MMS) server device, adapted to send the to-be-transferred file received from the file relay policy server device to the file receiver device as an MMS message; and/or an electronic mail email server device, adapted to send the to-be-transferred file received from the file relay policy server device to the file receiver device as an attachment to an email; and/or a File Transfer Protocol (FTP) server device, adapted to establish a connection with the file receiver device, and send the to-be-transferred file received from the file relay policy server device to the file receiver device through an FTP mode.

4. A file relay policy server device, comprising a processor coupled to a memory storing instructions for execution by the processor, and comprising:

a user interface module, adapted to receive identification information of a file receiver device which is in an offline state, a to-be-transferred file and attribute information of the to-be-transferred file from a file sender device which is in an online state;

a service inquiring module, adapted to send an inquiry request carrying the identification information of the file receiver device to an Instant Messaging IM server device to inquire for types of file transfer services subscribed to by the file receiver device in an IM system;

a file transfer mode determining module, adapted to determine a file transfer mode representing one of the types of file transfer services subscribed by the file receiver device according to the attribute information of the to-be-transferred file and the services subscribed to by the file receiver device in the IM system, returned from the IM server device and received by the service inquiring module; and a file forwarding module, adapted to forward the to-be-transferred file and identification information of the file receiver device received by the user interface module to a file relay server device corresponding to the file transfer mode determined by the file transfer mode determining module;

wherein the file transfer mode determining module comprises at least one module, adapted to:

generate a list of file transfer modes representing file transfer services among the types of file transfer services subscribed by the file receiver that are suitable for transferring files of the received attribute of the to-be-transferred file according to the attribute information of the to-be-transferred file and the services subscribed to by the file receiver device in the IM system, and returned from the IM server device and received by the service inquiring module;

send the generated list of file transfer modes to the file sender device for selecting a file transfer mode therefrom; and determine the file transfer mode according to a selection result from the file sender device.

5. The file relay policy server device according to claim 4, wherein the file transfer mode determining module comprises at least one module, adapted to prompt the file sender device of a file transfer failure when determining that there is no available file transfer mode.

6. A file transfer method, comprising:

receiving, by a file relay policy server device, identification information of a file receiver device which is in an offline state, a to-be-transferred file and attribute information of the to-be-transferred file from a file sender device which is in an online state;

sending, by the file relay policy server device, an inquiry request carrying the identification information of the file receiver device to an Instant Messaging IM server device to inquire for types of file transfer services subscribed to by the file receiver device in an IM system;

determining, by the file relay policy server device, a file transfer mode representing one of the types of file transfer services subscribed by the file receiver device according to the attribute information of the to-be-transferred file and the services subscribed to by the file receiver device in the IM system and returned from the IM server device; and forwarding, by the file relay policy server device, the to-be-transferred file and identification information of the file receiver device to a file relay server device corresponding to the determined file transfer mode, which forwards the to-be-transferred file to the file receiver device;

wherein determining, by the file relay policy server device, a file transfer mode according to the attribute information of the to-be-transferred file and the types of file transfer services subscribed to by the file receiver device in the IM system and returned from the IM server device comprises:

generating a list of file transfer modes representing file transfer services among the types of file transfer services subscribed by the file receiver that are suitable for transferring files of the received attribute of the to-be-transferred file according to the attribute information of the to-be-transferred file and the types of file transfer service subscribed to by the file receiver device in the IM system and returned from the IM server device;

sending the generated list of file transfer modes to the file sender device for the file sender device to select a file transfer mode therefrom; and determining the file transfer mode according to a selection result from the file sender device.

7. The method according to claim 6, further comprising:
prompting, by the file relay policy server device, the file sender device of a file transfer failure when determining that there is no available file transfer mode, wherein the file transfer failure is displayed at the file sender device.

8. The system according to claim 1, wherein the attribute information of the to-be-transferred file comprises a type, a size and a name of the to-be-transferred file.

9. The file relay policy server device according to claim 4, wherein the attribute information of the to-be-transferred file comprises a type, a size and a name of the to-be-transferred file.

10. The method according to claim 6, wherein the attribute information of the to-be-transferred file comprises a type, a size and a name of the to-be-transferred file.

* * * * *